(12) United States Patent
Sakai et al.

(10) Patent No.: US 7,180,527 B2
(45) Date of Patent: Feb. 20, 2007

(54) TEXT DISPLAY TERMINAL DEVICE AND SERVER

(75) Inventors: Ryutaro Sakai, San Francisco, CA (US); Tetsuya Kohno, Kanagawa (JP); Junichi Nagahara, Tokyo (JP); Hideaki Nishino, Kanagawa (JP)

(73) Assignees: Sony Corporation, Tokyo (JP); Sony Electronics Inc., Park Ridge, NJ (US); Sony Ericsson Mobile Communications Japan, Inc., Tokyo (JP)

( * ) Notice: Subject to any disclaimer, the term of this patent is extended or adjusted under 35 U.S.C. 154(b) by 0 days.

(21) Appl. No.: 10/505,203

(22) PCT Filed: Dec. 19, 2003

(86) PCT No.: PCT/JP03/16398

§ 371 (c)(1),
(2), (4) Date: Aug. 19, 2004

(87) PCT Pub. No.: WO2004/057566

PCT Pub. Date: Jul. 8, 2004

(65) Prior Publication Data

US 2005/0156947 A1    Jul. 21, 2005

(30) Foreign Application Priority Data

Dec. 20, 2002    (JP)    ............................ 2002-369356

(51) Int. Cl.
*G09G 5/397*    (2006.01)
(52) U.S. Cl. ...................................... 345/629
(58) Field of Classification Search ................ 345/629, 345/636
See application file for complete search history.

(56) References Cited

U.S. PATENT DOCUMENTS

| 5,818,447 | A  | * | 10/1998 | Wolf et al.   | ................. | 715/752    |
| 5,860,064 | A  | * | 1/1999  | Henton        | ................. | 704/260    |
| 6,064,383 | A  | * | 5/2000  | Skelly        | ................. | 715/758    |
| 6,405,225 | B1 | * | 6/2002  | Apfel et al.  | ................. | 715/526    |
| 6,507,643 | B1 | * | 1/2003  | Groner        | ................. | 379/88.14  |

(Continued)

FOREIGN PATENT DOCUMENTS

JP    2001-136556    5/2001

(Continued)

*Primary Examiner*—Kee M. Tung
*Assistant Examiner*—J. Amini
(74) *Attorney, Agent, or Firm*—Frommer Lawrence & Haug LLP; William S. Frommer; Thomas F. Presson

(57) ABSTRACT

This invention is relative with a text displaying terminal unit used for preparation, transmission/reception and display of a text message. A text message entered by a user is collated to a keyword and, if there is a keyword in the text, displaying attributes of the text and/or the background image are added to the text to send the resulting text added by the displaying attributes to a server (400). Alternatively, the server may collate the text to the keyword to add the displaying attributes of the text and/or the background image to the text. A receiving side terminal unit receives an XML document (240b), added by the displaying attributes, from the server to display the XML document added by the displaying attributes as a motion text message. This motion text message may also be provided by the server to the user as the Web information.

6 Claims, 12 Drawing Sheets

U.S. PATENT DOCUMENTS

| | | | |
|---|---|---|---|
| 6,606,744 B1* | 8/2003 | Mikurak | 717/174 |
| 6,622,140 B1* | 9/2003 | Kantrowitz | 707/5 |
| 6,671,818 B1* | 12/2003 | Mikurak | 714/4 |
| 6,763,226 B1* | 7/2004 | McZeal, Jr. | 455/90.2 |
| 6,784,901 B1* | 8/2004 | Harvey et al. | 715/757 |
| 2002/0107737 A1* | 8/2002 | Kaneko et al. | 705/14 |
| 2002/0116263 A1* | 8/2002 | Gouge | 705/14 |
| 2002/0133592 A1* | 9/2002 | Matsuda et al. | 709/225 |
| 2002/0138843 A1* | 9/2002 | Samaan et al. | 725/87 |
| 2002/0174186 A1 | 11/2002 | Hashimoto et al. | |
| 2003/0100320 A1* | 5/2003 | Ranjan | 455/466 |
| 2003/0110450 A1* | 6/2003 | Sakai | 715/529 |
| 2003/0189731 A1* | 10/2003 | Chang | 358/3.28 |

FOREIGN PATENT DOCUMENTS

| | | |
|---|---|---|
| JP | 2002-32306 | 1/2002 |
| JP | 2002-288213 | 10/2002 |
| JP | 2002-342242 | 11/2002 |
| JP | 2003-36234 | 2/2003 |
| WO | WO 02/21287 | 3/2002 |
| WO | WO 02/080476 | 10/2002 |

* cited by examiner

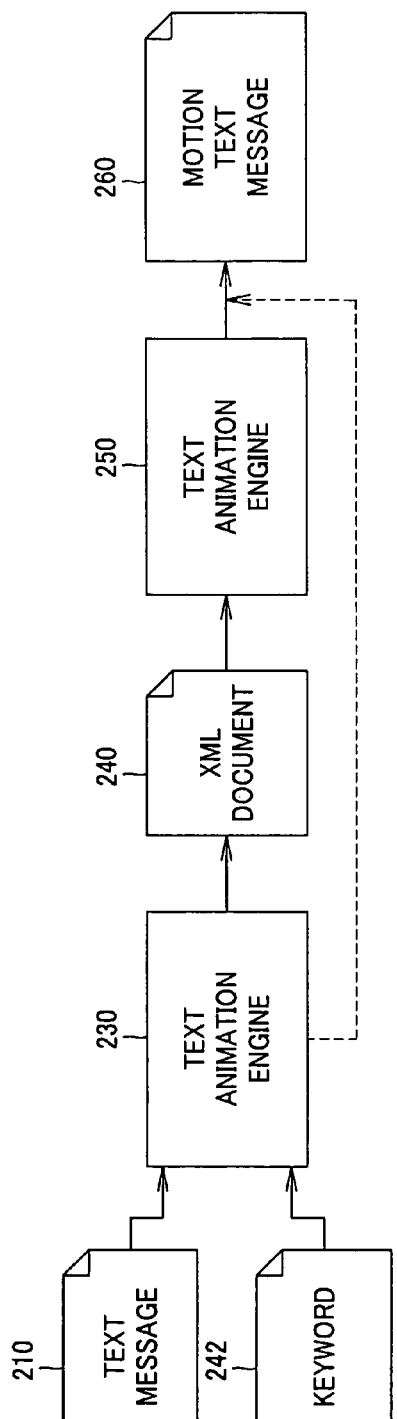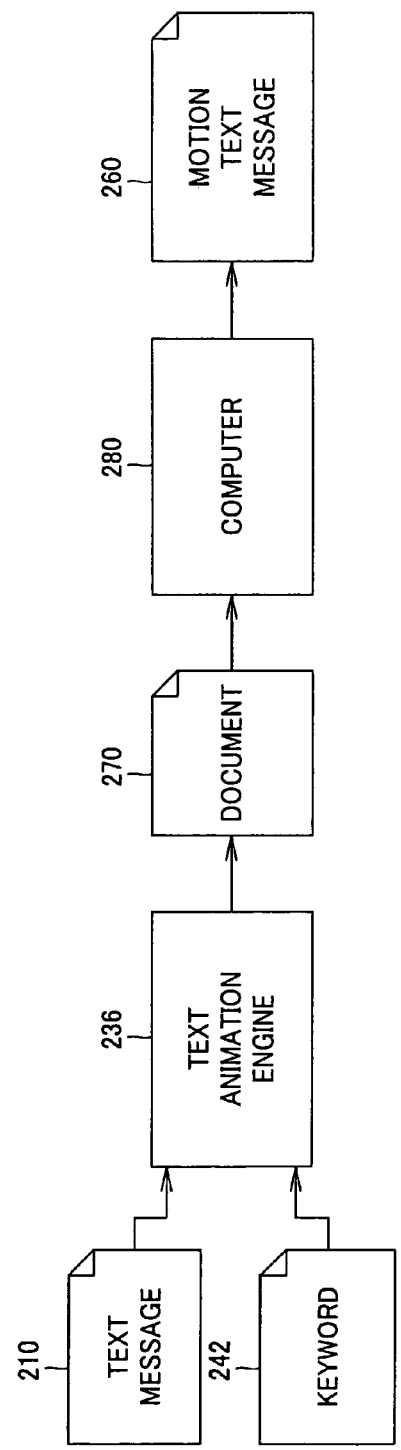
FIG.4A
FIG.4B

```
<?xml version="1.0" encoding="shift_jis"?>
<svg width="128" height="96">
<rect width="128" height="96" fill="rgb(200.0.200)">
</rect>
```
} 71

```
<image id="image1" x="20" y="140" width="15" height="15"
xlink:href="heart3.gif">
<animate attributeName="y" dur="4s" repeatCount=
"indefinite" from="140" to="-30"/>
</image>
```
} 72

```
<image id="image2" x="90" y="120" width="15" height="15"
xlink:href="heart3.gif">
<animate attributeName="y" dur="3s" repeatCount=
"indefinite" from="120" to="-30"/>
</image>
```
} 73

•
•
•

```
<text id="text01" x="-800" y="20" font="lovelove"
font-size="18" fill="rgb(255.255.255)">すき
<animate attributeName="x" dur="2s" repeatCount=
"indefinite"
keyTimes="0:0.5:1.9:2" values="-50:-5:15:130"/>
<animate attributeName="y" dur="2s" repeatCount=
"indefinite"
keyTimes="0:0.5:1.9:2" values="-50:20:30:130"/>
</text>
```
} 74

FIG.7

| KEYWORD | BACKGROUND SIZE/COLOR | MOVEMENTS OF BACKGROUND IMAGE | MOVEMENTS OF TEXT POSITION/FONTS |
|---|---|---|---|
| love | PATTERN 11 | PATTERN 12 | PATTERN 13 |
| love | PATTERN 21 | PATTERN 22 | PATTERN 23 |
| love | PATTERN 31 | PATTERN 32 | PATTERN 33 |
| OOPS | PATTERN 41 | PATTERN 42 | PATTERN 43 |
| NO | PATTERN 51 | PATTERN 52 | PATTERN 53 |
| ... | ... | ... | ... |

FIG.8

TEXT DISPLAY TERMINAL DEVICE AND SERVER

TECHNICAL FIELD

This invention relates to preparation, transmission/reception and display of a text message. More particularly, it relates to a terminal unit for displaying a text, and a server, making up a system for re-forming a text message for text communication into a moving picture, and for displaying the so re-formed moving picture.

This application claims priority of Japanese Patent Application No.2002-369356, filed in Japan on Dec. 20, 2002, the entirety of which is incorporated by reference herein.

BACKGROUND ART

Recently, with progress in computers and communication, the communication by text, over a communication network, such as E-mail, instant messaging or chat, that is, the text communication, has become popular.

In oral communication, the feeling (state of mind) may be represented by strength of utterance, intonation, sounding and fastness of tempo. On the other hand, these are expressed, in the conventional text message, by the sorts (style) or size (point number) of standard fonts or color, such that the message is of unanimous static appearance, devoid of feeling, and hence is insipid and monotonous.

In Japanese Laid-Open Patent Publication 2002-207671 and 2002-207673, there has been proposed a technique in which the text entered by a user may be changed in text attributes, such as style, point numbers or colors at the time of text input.

With this method, extremely complicated operations of selecting and highlighting a passage of an input text, the attribute of which is desired to be changed, selecting the font sort (style) from a pull-down menu, selecting the point number from a size pull-down menu and selecting the color from a color palette, and hence the method has not routinely been used in e.g. e-mail. Moreover, even if the attributes of the letters and characters are changed in this manner, it is difficult to transmit e.g. the feeling properly, based solely on the attributes of the letters or characters.

In Japanese Laid-Open Patent Publication 2002-32306, there is disclosed a technique of detecting the phrase showing the feeling in the mail sentence to reflect the feeling in the movements of an animation (doll) at the time of displaying the mail. However, in this technique, only the movements of the doll are changed, while the doll itself remains unchanged. Additionally, the text itself is not changed.

Recently, the mobile terminal units, typified by mobile phones, have come into widespread use. With these mobile terminal units, it is possible to exchange text messages or browse Web data over a communication network, including the Internet.

DISCLOSURE OF THE INVENTION

It is an object of the present invention to provide a novel text displaying terminal unit and a server in which it is possible to eliminate the drawback inherent in the above-described conventional technique.

It is another object of the present invention to provide a novel text displaying terminal unit in which visual expressions may automatically be enriched in dependence upon the keyword in a transmitted text message, and a server.

A text displaying terminal unit according to the present invention comprises means for memorizing a preset keyword, means for receiving an input text, display means for displaying the information on a display picture domain, means for verifying whether or not there exists a keyword in the input text, means for adding to the text preset displaying attributes of the text and/or a background image associated with the keyword, if such keyword exists, means for transmitting the text information, corresponding to the text added by the preset displaying attributes over a communication network, as a message, means for receiving the message over the communication network, and display control means for displaying the message on the display picture domain.

With this text displaying terminal unit, it is checked whether or not there is any keyword contained in a text received from a user. If there is any keyword contained in the received text, the displaying attributes of the text and/or a background image, associated with the keyword, are added to the text. The text information, now containing the displaying attributes, is transmitted as a message over the communication network. The message received over the communication network is demonstrated on a display picture domain.

The displaying attributes of the background image may further include the attributes determining the image movements. The displaying attributes of the movements of letters or characters may also be added to the text information.

There may be provided means for the user to register the keyword and the displaying attributes associated with the keyword. This accords desirable displaying attributes for desired keywords from user to user.

A server connected to a text displaying terminal unit over a communication network, according to the present invention, comprises means for memorizing a preset keyword, means for receiving a text message over the communication network from the text displaying terminal unit, means for verifying whether or not there exists the keyword in the received text, means for adding preset displaying attributes of the text and/or a background image, associated with the keyword, to the text, if such keyword exists, and means for transmitting a message, corresponding to the text added by the preset displaying attributes, to a destination of the text message.

This server receives a text message from the terminal unit over the communication network, and verifies whether or not there is any keyword in the received text. If there exists a keyword, preset displaying attributes of the text and/or the background image, associated with the keyword, are added to the text, and the message is sent to the destination of the text message.

A further server, connected to a text displaying terminal unit over a communication network, according to the present invention, comprises means for memorizing a preset keyword, means for receiving a text message over the communication network from the text displaying terminal unit, means for verifying whether or not there exists the keyword in the received text, means for adding preset displaying attributes of the text and/or a background image, associated with the keyword, to the text, if such keyword exists, and means for accumulating a message, corresponding to the text added by the preset display attributes, in the form of the Web information, so that a user of the destination of the text message is able to browse the message.

This server receives the text message over the communication network from the terminal device and verifies whether or not there is any keyword in the received text. If there exists a keyword, preset displaying attributes of the text and/or the background image, associated with the keyword, are added to the text, and the text with the displaying attributes added thereto is accumulated in the form of the Web information so that the user of the destination of the text message is able to browse the text with the displaying attributes added thereto.

In any server, means may be provided for accepting the registration of the keyword and the displaying attributes associated with the keyword, over the communication network, from one user to another.

The present invention may be comprehended as a computer program for implementing the functions of the server and the unit, and as a recording medium having the computer program stored therein.

According to the present invention, in case a keyword is contained in a text message, the displaying attributes of the background or the letters or characters proper to the keyword may automatically be imparted, whereby it becomes possible to expand and enrich the power of expression. The party receiving this message is able to view the displayed message, supplied with the displaying attributes, and the imaginative expressions not contained in the original text.

Other objects and advantages of the present invention will become more apparent from the following description of the preferred embodiment which is now made with reference to the accompanying drawings.

BRIEF DESCRIPTION OF THE DRAWINGS

FIGS. 4A and 4B illustrate the forms of messages and the processing elements employed in the present invention.

FIG. 7 shows an example of an XML document associated with the exemplary display of FIG. 6A.

FIG. 8 shows an illustrative structure of an XML document for coping with the exemplary display of FIG. 6A.

BEST MODE FOR CARRYING OUT THE INVENTION

Figure 1A:
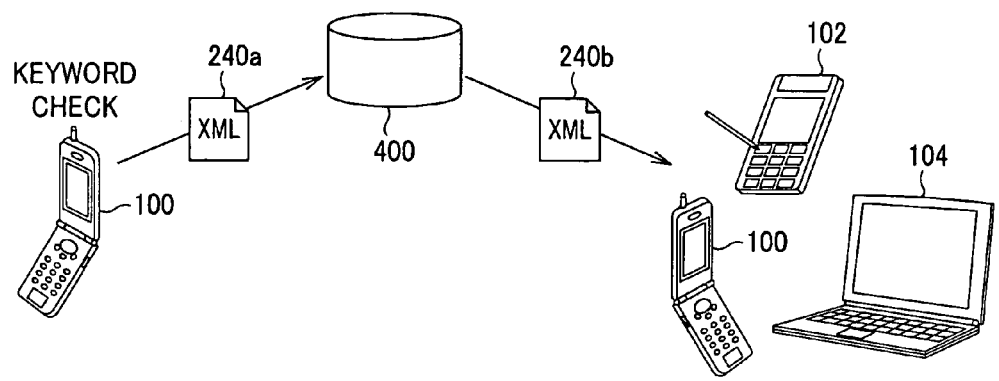
FIGS. 1A to 1C are schematic views showing a system embodying the present invention.

Referring to the drawings, a terminal unit for displaying the text and a server, according to the present invention, are explained in detail.

Figure 1B:
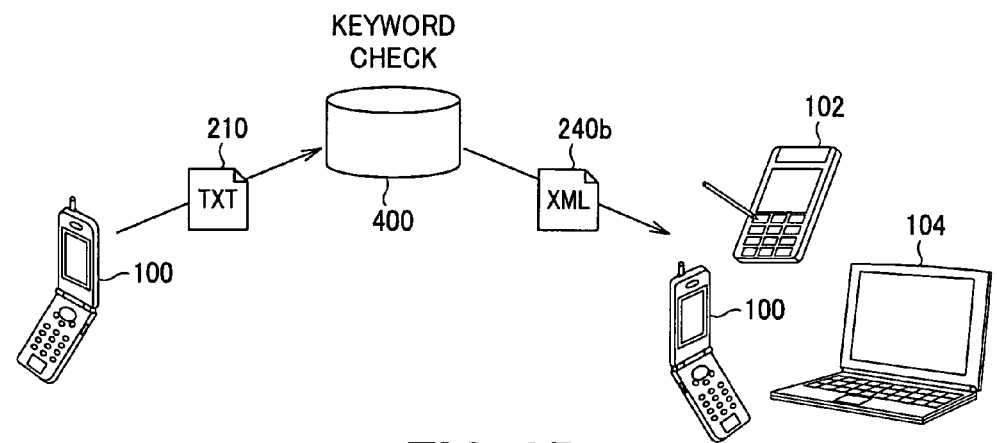
Figure 1C:
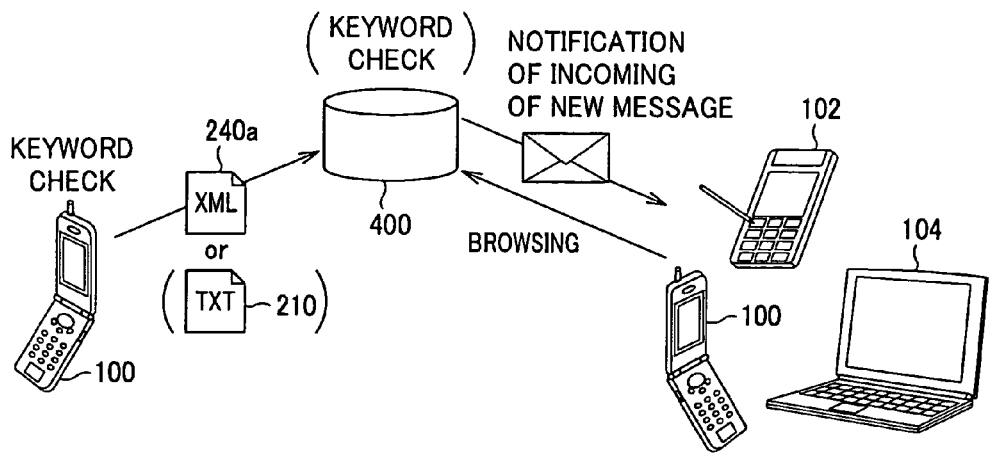

FIGS. 1A to 1C show a schematic structure of the system according to the present invention. An E-mail system is shown herein as an example of the system for transmitting/receiving text messages. The E-mail is sometimes referred to herein simply as mail. This system is made up by plural terminal units (terminal units) 100, 102, 104 and a server 400, interconnected over a communication network, not shown.

In the system shown in FIG. 1A, the transmitting side terminal unit executes key word check and sends a message 240*a* of a preset format, herein XML, to the server 400, as a text message including the needed display attribute information. The server 400 sends an XML document 240*b*, which is the same as the message 240*a*, or which corresponds to the message 240*a* in which the display attribute information has been added or changed, to the receiving side terminal unit. The terminal unit includes a mobile terminal, such as a mobile phone or a mobile information terminal (PDA), or a personal computer (PC). In FIG. 1A, only the mobile phone as a transmitting side terminal unit is shown because forming the mail in the present invention may be applied with advantage to a terminal unit limited in the display area and in the input function, such as the mobile phone. This does not mean that present invention cannot be applied to a terminal other than the mobile phone as a transmitting side terminal unit.

In the system shown in FIG. 1B, a message 210 of a text form is sent from a transmitting side terminal unit to the server 400 which then performs key word check to formulate an XML document added by a needed display attribute. Thus, it is not mandatory for the transmitting terminal unit to formulate the XML document. The server 400 transmits the XML document 240*b* to the receiving side terminal unit.

FIG. 1C schematically shows another mail system called Web mail or browser mail. In this system, the processing in the transmitting side terminal unit is the same as that shown in FIG. 1A or 1B. The server 400 accumulates the XML documents, added by the display attribute, on the server 400 in the form of the Web information, so as to permit the browsing thereof by the user as a destination. The server 400 also notifies the user (terminal unit) as the destination of the incoming of a new mail. The receiving side terminal is responsive to this notification to access the server 400 by the Web browser in order to browse the message. The server 400 sends the XML document 240*b* to the receiving side terminal unit. The functions of the server 400 may also be implemented on plural distributed servers.

Figure 2:
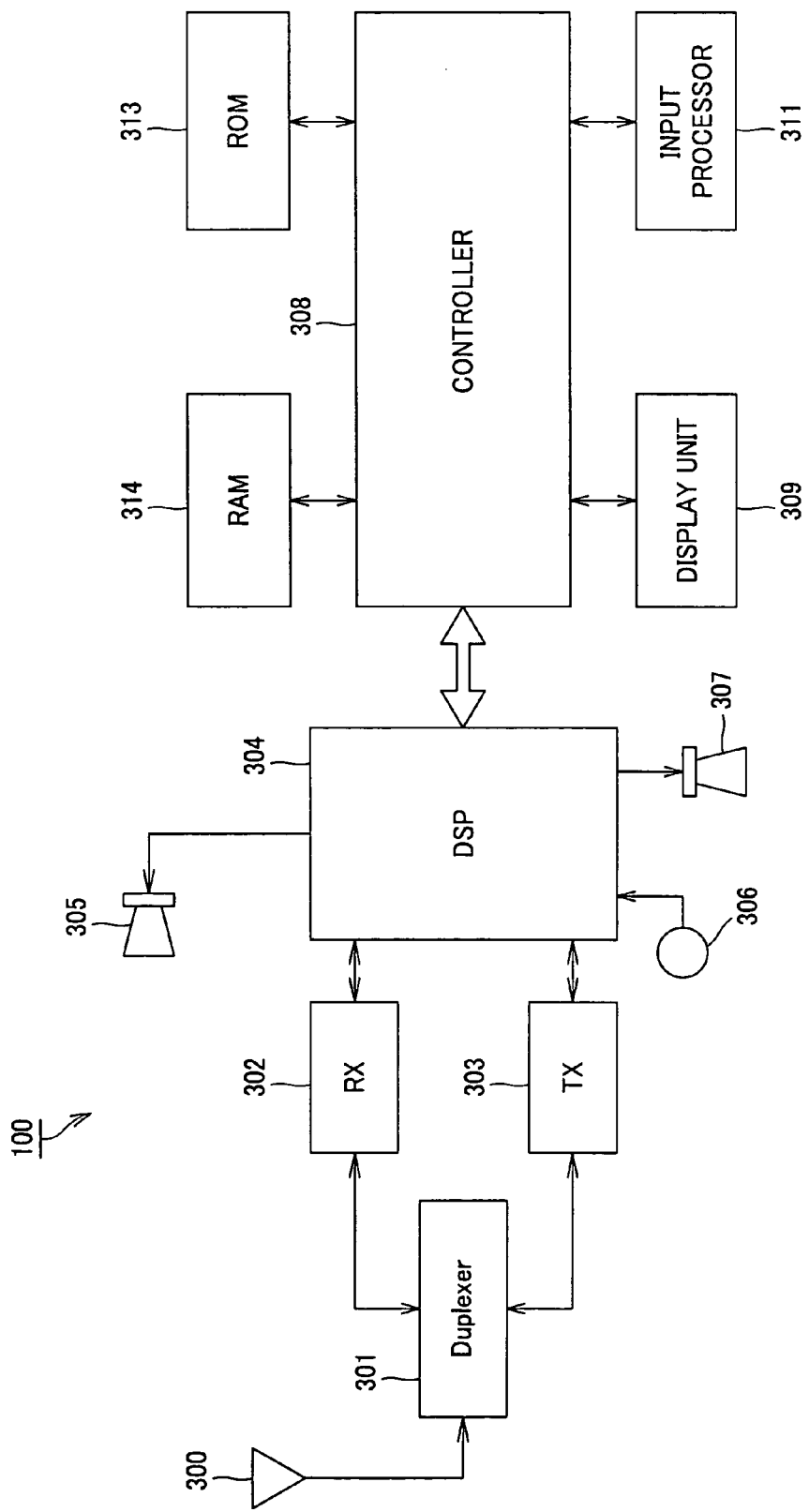
FIG. 2 is a block diagram showing a hardware structure of a terminal unit embodying the present invention.

FIG. 2 depicts a block diagram showing the hardware structure of the terminal unit (mobile terminal unit) 100 according to the present invention.

The terminal unit 100 includes, as parts or components relevant to the telephone and communication functions, an antenna 300, a duplexer 301, also used as an antenna, a receiving unit (RX) 302, a transmitting unit (TX) 303, a digital signal processor DSP 304, a loudspeaker 305, a microphone 306, and an ear receiver 307. The terminal unit 100 also includes, as parts or components relevant to the controlling of the terminal unit, a controller 308, a display unit 309, a display unit 309, an input processor 311, a ROM 313 and a RAM 314. The controller 308 is formed by e.g. a central processing unit (CPU). The input processor 311 includes e.g. a variety of keys, buttons or jog dials provided to the terminal unit. In the ROM 313 is stored a control program for implementing the operations which will be explained subsequently. The ROM 313 may also include a rewritable memory, such as a flash ROM. In the ROM 313 and/or in the RAM 314, there are stored data pertinent to the present invention, such as font data, key words or tables. In the RAM 314, there are stored e.g. a variety of documents.

Figure 3:
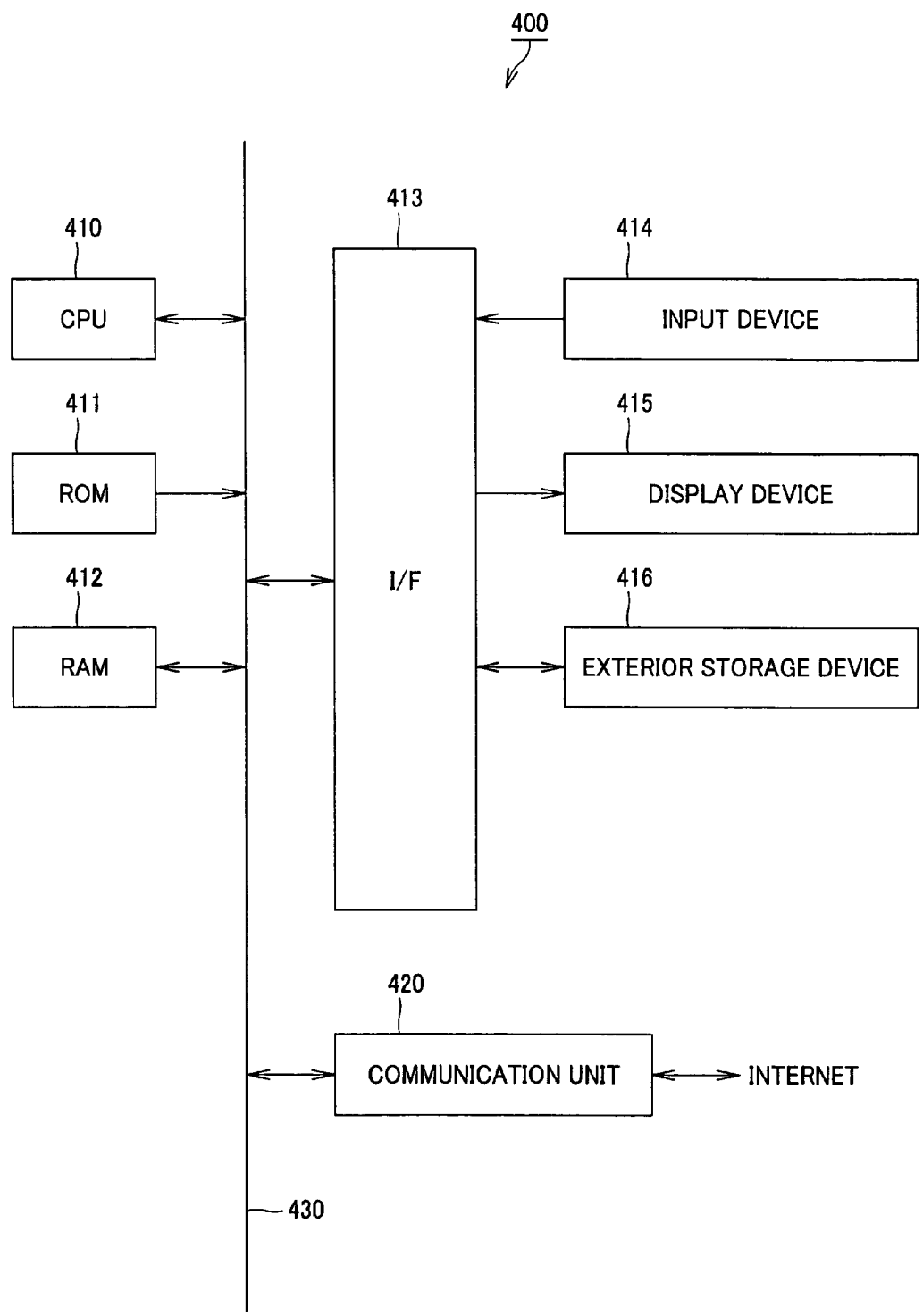
FIG. 3 is a block diagram showing a hardware structure of a server embodying the present invention.

FIG. 3 shows the hardware structure of the server 400.

A central processing unit (CPU) 410 executes an OS (operating system) and a variety of application programs to control various parts or components of the server. In the ROM 411, there are stored a program executed by the CPU 410 and data of fixed nature. The RAM 412 provides an operating area for the CPU 410 or a transient storage area for data. The ROM 411 and the RAM 412 are connected over a bus 430 to the CPU 410. An input device 414, such as a keyboard, a display device 415, such as a CRT or a liquid crystal display, and an exterior storage device 416, such as hard disc drive, MO or CD-ROM, are connected to the bus 430 over an interface 413. The bus 430 is connected via a communication unit 420 to a network, such as the Internet. The hardware structure of a terminal 104, such as PC, or a terminal 102, such as PDA, is basically the same as that described above.

Referring to FIGS. 4A and 4B, the message form and the processing elements in the present invention are hereinafter explained.

In a configuration of FIG. 4A, a message (text message) 210 of the text form, entered by the user, is collated to a preset keyword 242 by a text animation engine 230, as later explained. In case a keyword is detected, the text message is converted into a document 240 of a preset format, such as XML (eXtensible Markup Language), added by the display attribute. This XML is a markup language which adds the information, which in turn adds an attribute, such as a tag, to a string of characters or letters of the text. Here, the markup language, conforming to the SVG (Scalable Vector Graphics), is taken as an example. The SVG is able to define a two-dimensional picture, using a tag conforming to XML, determining the image attributes, thereby to generate an image re-formed into a moving picture. The SVG is able to display not only the shape of the two-dimensional vector graphics but also a bit map graphics and the text.

The XML document 240 is further converted, by a further text animation engine 250, into a text message, re-formed into a moving picture (motion text message) 260. This motion text message 260 is reproduced in a terminal unit by a preset player so as to be demonstrated as a moving picture. The conversion from the text into the XML document 240 by the first text animation engine 230 corresponds to the processing by the transmitting side terminal shown in FIGS. 1A and 1C or to the processing by the server 400 shown in FIG. 1B, whilst the conversion from the XML document to the motion text message 260 by the second text animation engine 250 corresponds to the processing by the receiving side terminal shown in FIGS. 1A and 1B or to the processing by the server 400 shown in FIG. 1C.

Meanwhile, the text message 210 may directly be converted by the text animation engine 230 into the motion text message 260. This allows the transmitting side terminal unit to have a pre-view of the XML document, prior to transmission, as a motion text message.

In FIG. 4B, the text message 210 is collated by a text animation engine 236 to a preset keyword and converted into a document of a further format 270. This document of the further format is utilized in case a receiving side terminal unit (computer) 280 does not include the function equivalent to the text animation engine 250, and is e.g. a QuickTime file, a Real Player file or a Macromedia Flash file. The computer 280 converts this document 270 into the motion text message 260. This motion text message may be no other than the format of the QuickTime file, a Real Player file or a Macromedia Flash file.

Figure 5:
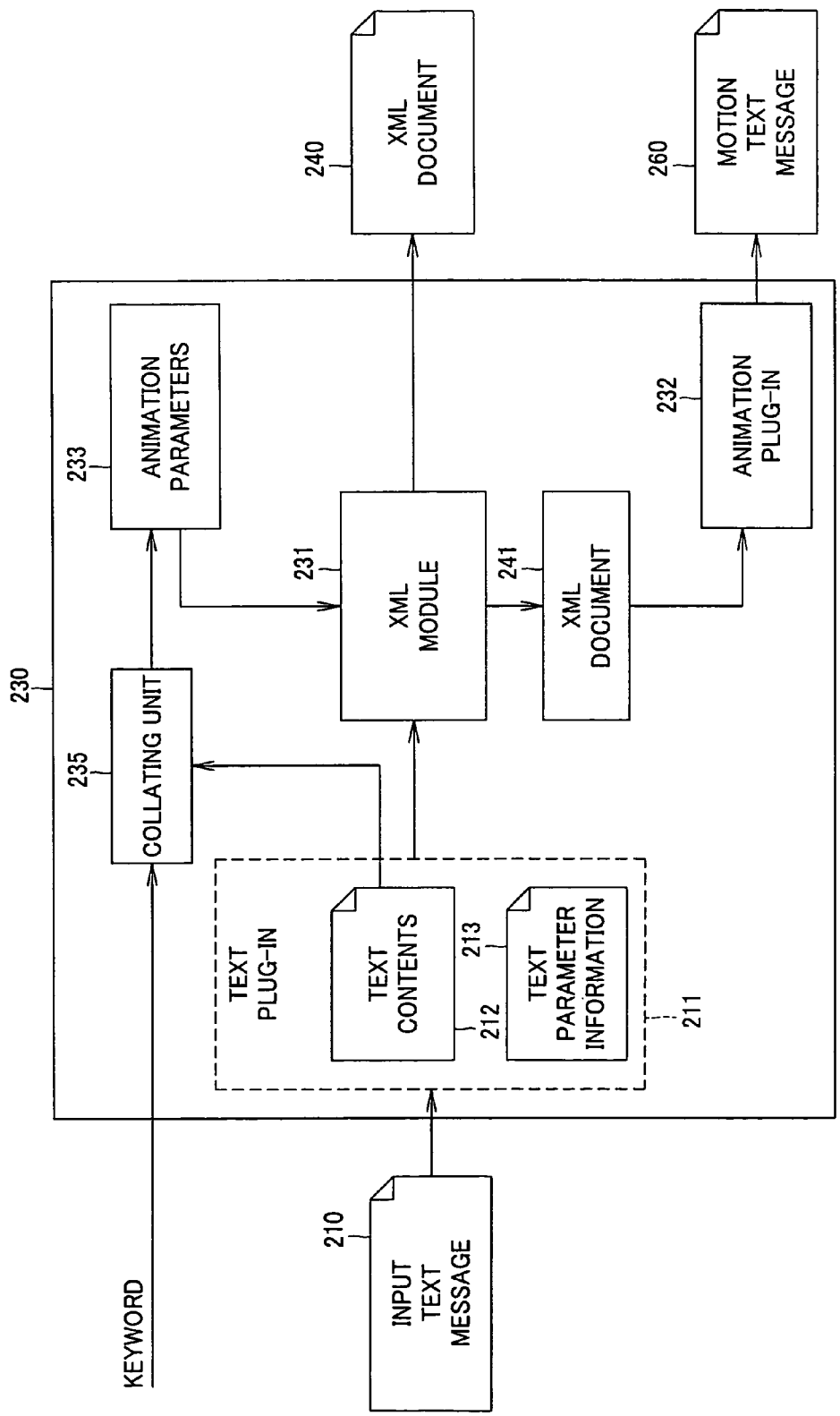
FIG. 5 is a block diagram showing an illustrative structure of a text animation engine shown in FIGS. 4A and 4B.

FIG. 5 shows an illustrative structure of the text animation engine 230. This text animation engine 230 includes a text plug-in 211, a collation unit 235, an XML module 231 and an animation plug-in 232. The text plug-in 211 extracts text contents 212 in the input text message 210. If, in the terminal apparatus, the user is able to specify the displaying attributes, such as style, letter or character size or color, such displaying attributes may be annexed to the text message 210.

In such case, the text plug-in 211 extracts the displaying attributes as text parameter information 213. The contents of animation parameters 233 include e.g. (1) the background color, still image or a motion image, (2) sort, size, color and the degree of transparency of the font, (3) motion, such as scroll, text fade-in, text fade-out and flickering.

According to the present invention, a preset combination associated with the keyword is selected, from among the animation parameters 233, by collating the text contents 212 to the keyword in the collation unit 235. The keyword will be explained subsequently. The XML module 231 generates the XML document 240 based on the currently selected contents of the animation parameters 233, text contents 212 and the text parameter information 213. The XML module 231 outputs an XML document 241 equivalent to the XML document 240 to the animation plug-in 232, which animation plug-in 232 is able to convert the XML document 241 into the motion text message 260. The animation plug-in 232 may be exemplified by Macromedia Flash, Macromedia Director, Java, JavaScript, AdobeAftereflects, AdobePremier and C++, these being all trademarks.

Figure 6A:
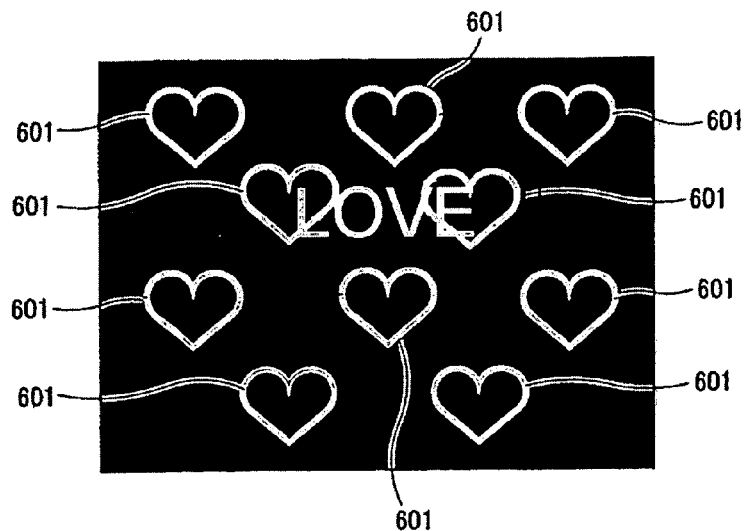
FIGS. 6A to 6C show exemplary display of a text message, inclusive of a specified keyword, in a receiving side terminal unit, and exemplary preview display thereof in a transmitting side terminal unit.
Figure 6B:
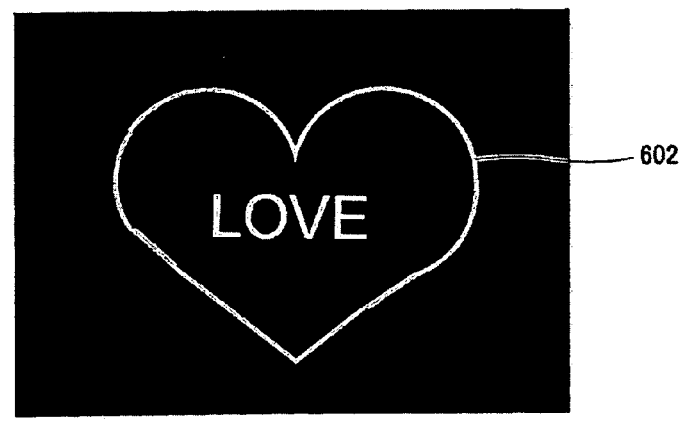
Figure 6C:
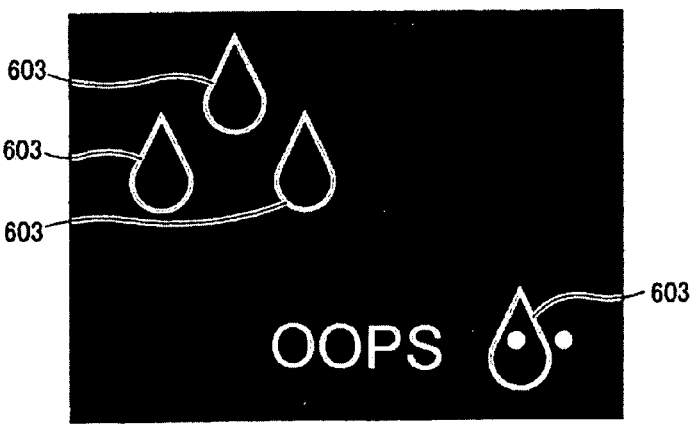

FIGS. 6A, 6B and 6C show exemplary display at a receiving end terminal unit and exemplary preview display at a transmitting end terminal of the text message including specified keywords. FIGS. 6A and 6B show different examples of the exemplary display for the same keyword and FIG. 6C shows an example of the exemplary display for a different keyword 'あちゃあ' ('oops', uttered as "achaa"). As the background, one or more images (icons) 601, 602, 603 appropriate for the keywords (herein marks representing the heart and the sweat) are displayed, these icons making movements peculiar to the associated keywords. Preferably, the letters or characters entered by the user are displayed in a style peculiar to the keyword in question, and may be set so as to perform preset movements. However, according to the present invention, changes in the displaying attributes of the letters or characters, such as changes in the style of the letters or characters, or movements of the letters or characters, in keeping with the keyword, are not mandatory. The strings of the letters or characters are provided with movements, in terms of words or phrases of a shorter length as a unit, which unit may be determined depending on the selection or finalizing operation at the time of inputting the letters or characters by the user. For example, a string of letters or characters of a shorter length may be set as a unit of one display picture domain, while a longer string of letters or characters may be sequentially displayed in plural subdivided display picture domain portions. The unit of the string of letters, contained in a display picture domain, may not be composed only of a keyword, but include a text part, other than the keyword.

FIG. 7 shows an example of an XML document associated with the exemplary display shown in FIG. 6A. A descriptive part 71 shows the initial setting information and determines the size or the color of the SVG area and the background area. The size of each area so set is 128 in width and 96 in height. The point of origin of the coordinate system is at the left upper corner of the area. On the other hand, descriptive parts 72, 73 determine the initial positions (x and y coordinates) and the size of the heart-shaped icons, presented on the background of the text, as well as the figures making up the icons, while defining the movements thereof. In the present embodiment, ten heart-shaped icons, and ten descriptive parts, analogous with one another, are provided in association with the respective icons. The picture information, here a file heart3.gif, is specified as a figure. This picture information may be saved in a terminal unit or in a server. In the case of the descriptive part 72, the operations of causing the y-coordinate to be moved from a value 140 to a value −30 every four seconds are prescribed to occur repeatedly an infinite number of times. By setting the beginning and end points outside of the areas, the above operations, if repeated, appear to a viewer as if a heart mark is presented from the lower end of the display picture domain to move upwards to vanish to above the display picture domain, with the heart mark again appearing from the lower end of the display picture domain. Meanwhile, the initial position and the movements of the icons are set from one icon to another.

A descriptive part 74 determines the initial position of a string of characters "すき" ('love', uttered as "suki"), sort, size and the color of the fonts, while also determining the movement. The movements of the string of letters or characters are now explained by taking an example of the descriptive part 74. In the present instance, the x-coordinate of the string of characters "すき" are repeated every two seconds a limitless number of times. Within this period of the two seconds, the x-coordinates assume the values of −50, −5, 15 and 130 at time points of 0. 0.5, 1.9 and 2 seconds, with the x-coordinates assuming interpolated values in-between the respective time points. By sub-dividing each period and individually specifying the time points in each period and the corresponding positions of the x-coordinates, the speed of the icon movement may be varied. For example, such an effect may be obtained in which an icon is intruded into a display picture domain with acceleration, moved at a slow speed and again accelerated to vanish to outside the display picture domain. Similar designation may be made for the y-coordinate.

In case the special style of a letter or a character cannot be used in a terminal unit, a picture, such as a gif image, may dynamically be prepared by the server for each string of letters or characters and embedded in the XML. In case the presence or the absence of the style necessary from e.g. the machine type information of the receiving side terminal unit can be verified in advance on the server side, the server is able to verify whether or not a string of letters or characters needs to be converted into a picture. Although FIG. 7 shows only the particular background image and the movements of the letters or characters, this is merely illustrative and movements different from those shown are also possible.

Although no examples of XML description for the exemplary display of FIGS. 6B and 6C are shown, the icon size may be periodically enlarged/contracted, as the movements of the heart-shaped icons, as the sole background image, in FIG. 6B, to represent the state of heart-throbbing. In FIG. 6C, such movements are possible in which an icon of the shape representing the sweat appears from above the display picture domain to fall down to disappear from the display picture domain.

FIG. 8 shows, as an illustrative structure of animation parameters 233, an example of a table 233a, forming a portion of the animation parameters. This table may be held by a terminal unit or a server. The attributes of 'background size/color etc.', the attributes of the 'background image movement etc.' and the attributes of the 'text position/font/movements etc.' are defined, as preset pattern data (template) from one keyword to another. For example, the attribute of the background size/color corresponds to the descriptive part 71, while the attributes, such as background image movement, correspond to the descriptive parts 72 and 73 in the case shown in FIG. 7. The attributes of the 'text position/font/movements etc.' correspond to the descriptive part 74 of the case shown in FIG. 7. Here, the strings of letters or characters are left as blank columns and are filled therein later.

The keyword registered in the table 233a may be the default keyword, provided from the outset, and/or the keyword registered by the user. In case the user registers a keyword, the user is to be at a position to select a desired one of plural alternatives of pattern selection for the respective attributes for the keyword as entered by the user. Preferably, the new alternative may be downloadable from a server over a communication network. If this table is placed on a server, at least the table portion registered by the user is saved for the particular user such that the table information for the user is usable based on the user identification information, such as mail address.

As text movements, a large variety of configurations may be possible. For example, a text flows from a lateral side to flow out from the display picture domain. A text may be seen to be enlarged and contracted repeatedly and may appear as if it is breathing. A text may appear on the display picture domain initially with a large size to then become smaller in size. A text may be intruded into the display picture domain at random from an arbitrary direction to vanish at the opposite side. A string of letters or characters, appearing anew, may be superposed at all times on another old string of letters and characters, with the old string of letters or characters gradually rising towards an upper region in the display picture domain. Or, each string of letters or characters may bounce like a spring about a point as center.

Figure 9:
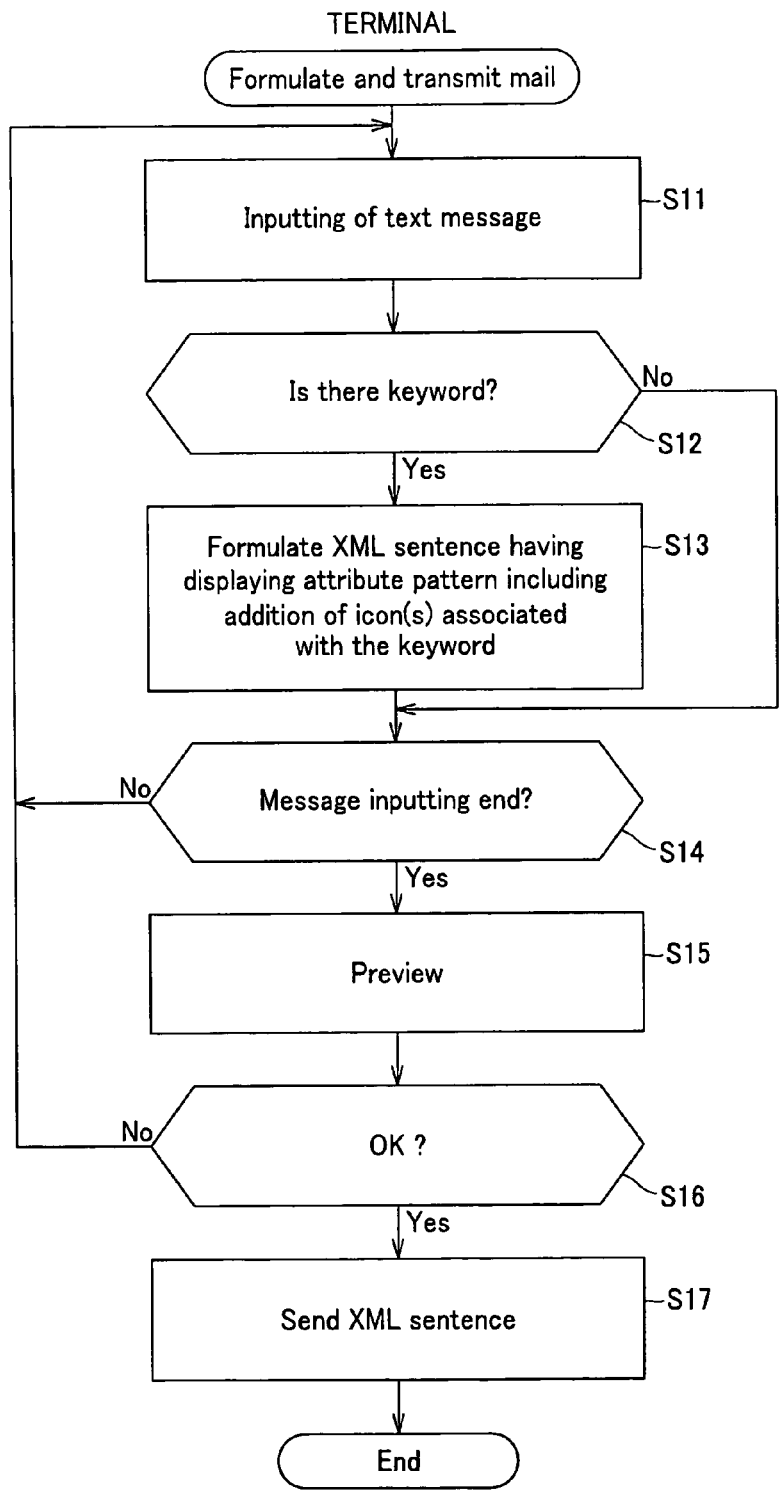
FIG. 9 is a flowchart for illustrating mail forming and transmission processing at a transmitting side terminal unit embodying the present invention.

FIG. 9 depicts a flowchart for illustrating the processing of mail formulation and transmission at the transmitting side terminal unit. This processing corresponds to the processing at the transmitting side terminal unit shown in FIG. 1A.

First, a text message is input, responsive to the user's inputting operation (S11). It is then checked whether or not there exists a keyword in the text (S12). If the keyword exists, the table 233a, shown in FIG. 8, is referred to, and an XML document, to which has been added a pattern of the displaying attributes, including one or more icons, associated with the keyword, is prepared (S13). On completion of the inputting of a message (YES in S14), this XML document is converted into the aforementioned motion text message to make a pre-view (S15). At this time, the message to be pre-viewed is the combination of the keyword-based style, color of the letters or characters, movements and the background image, with the display attribute information, if any, added and entered by the user at the time of the inputting of the letters or characters. If the user has checked the pre-view and is desirous to correct the message (NO in step S16), processing may revert to a message input. If there is no problem, this XML document is sent to the server (S17). It is preferred that the user shall be able to update the contents of the table 233a or to supplement a keyword(s). In this connection, there may be provided a plural number of patterns of the displaying attributes that may be selected by the user.

Figure 10:
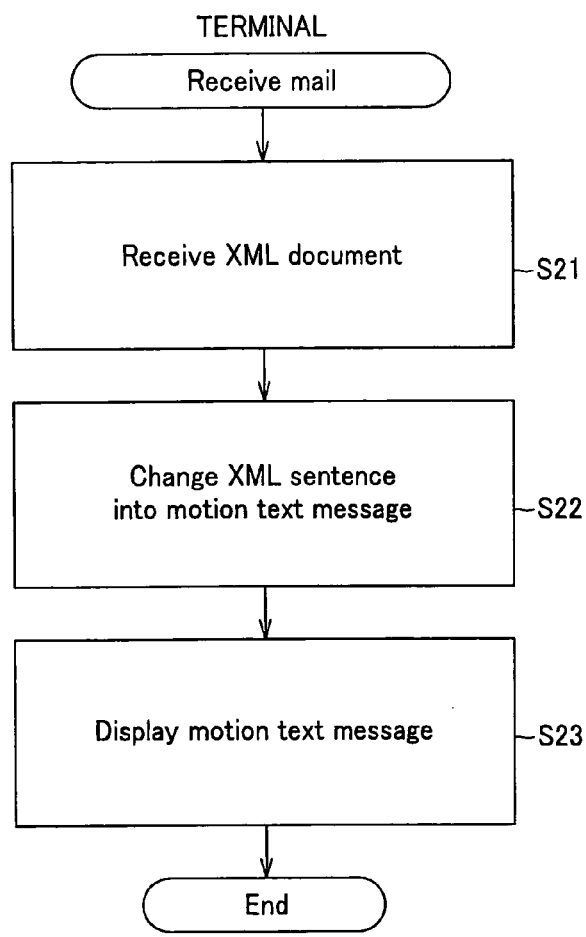
FIG. 10 is a flowchart for illustrating the processing of mail reception in a terminal unit receiving the message transmitted by the processing of FIG. 9 from a server.

FIG. 10 shows the processing of mail reception by a terminal receiving the message from a server. When a terminal unit has received an XML document, either automatically responsive to a notification of the incoming of a mail from the server, or in keeping with the user's command (S21), the XML document is converted into a motion text message, by the text animation engine 250, as described above (S22). Additionally, this motion text message is demonstrated on a preset player (S23).

Figure 11:
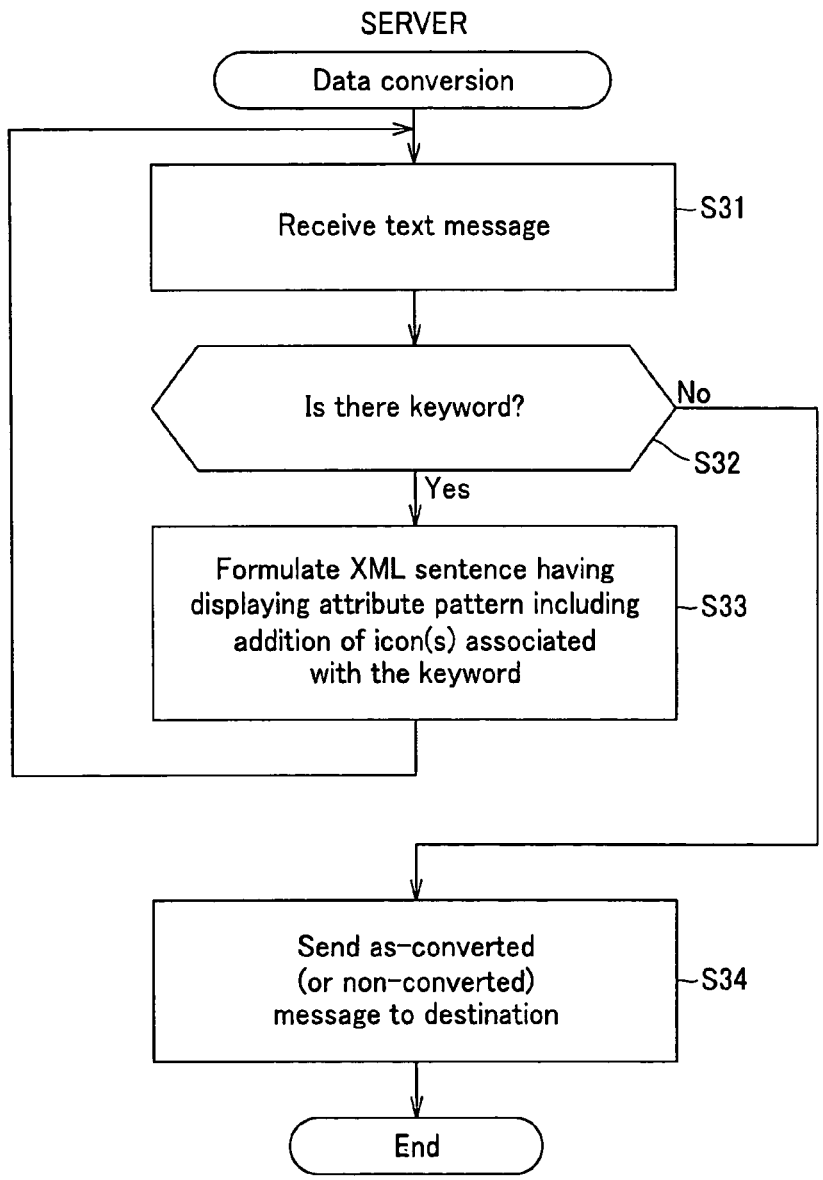
FIG. 11 is a flowchart showing the data conversion processing in a server corresponding to the server processing shown in FIG. 1B.

Referring to FIG. 11, the processing of data conversion in the server is now explained. This corresponds to the processing in a server 400 shown in FIG. 1B. The server 400 receives the text message 210, containing no display attribute information, from the transmitting side terminal unit (S31) to perform keyword check (S32). If there is a keyword, an XML document, having a display attribute pattern, including an icon(s) associated with the keyword, in accordance with the aforementioned table, is prepared (S33). If there are plural keywords, the above sequence of operations is repeated. If the keywords are depleted, the as-converted message is sent to the destination, responsive to the request from the destination user or to an automatic request for reception responsive to the incoming notification (S34). If there is no keyword in the received text message, the non-converted message is sent to the destination.

Figure 12:
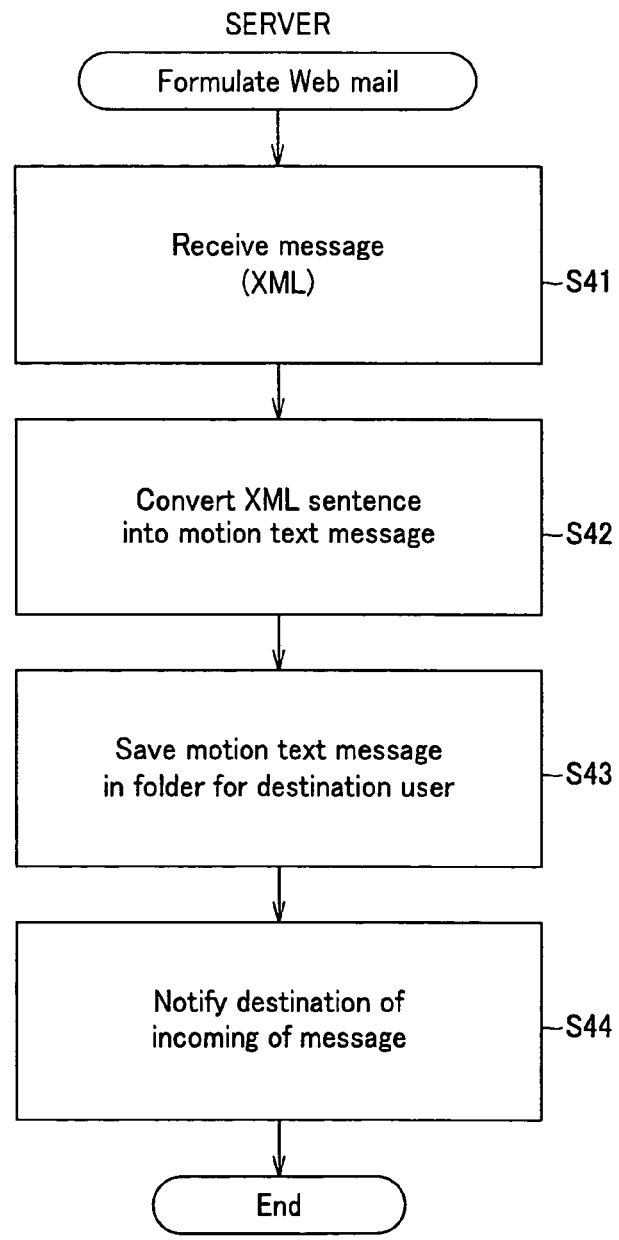
FIG. 12 is a flowchart showing the data conversion processing in the server in a Web mail system illustrated in connection with FIG. 1C.

FIG. 12 depicts a flowchart of data conversion processing by a server in the Web mail system as explained with reference to FIG. 1C.

On receipt of the message (XML) in this processing (S41), the server converts this XML document into the motion text message (S42) by means equivalent to the text animation engine 250 shown in FIG. 2 (S42). This motion text message, as Web data, is stored in a folder for the user as the mail destination (S43). The notification on the incoming of the message is made to the user as the destination (S44). In this notification on the incoming is embedded the link information used in accessing the Web data. On receipt of this notification, the user may access this server from the terminal unit to browse the Web data in the folder allocated to no other than the user.

According to the present invention, the finished message is pleased to view in contradistinction from the conventional static text which is insipid and monotonous. An image corresponding to the keyword is reflected in the finished message, such that the receiver is able to enjoy the mail reproduced with more imaginative expressions.

Although the present invention has so far been elucidated with reference to certain concrete embodiments, the present invention encompasses various changes from the illustrated embodiments. For example, the picture illustrated or specified descriptions of XML are given for illustration only and are not intended for limiting the invention. That is, various changes, substitutions or equivalents may be made by those skilled in the art without departing from the scope of the invention defined in the added claims.

The invention claimed:

1. A text displaying terminal unit comprising
means for memorizing a table of preset keywords and corresponding preset displaying attributes; wherein said preset displaying attributes include background information, background movements, and input text movements;
means for receiving an input text;
display means for displaying information corresponding to said input text on a display picture domain;
means for verifying whether or not there exists a keyword in the input text;
means for adding to said input text preset displaying attributes associated with said keyword, if such keyword exists in said table of present keywords;
means for transmitting the information, corresponding to said input text added to by said preset displaying attributes, as a message, over a communication network;
means for receiving said message over said communication network; and
display control means for displaying said message on said display picture domain.

2. The text displaying terminal unit according to claim 1 further comprising means for a user registering the keyword and displaying attributes associated with said keyword in said table.

3. A server connected to a text displaying terminal unit over a communication network, said server comprising
means for memorizing a table of preset keywords and corresponding preset displaying attributes; wherein said preset displaying attributes include background information, background movements, and input text movements;
means for receiving a text message over said communication network from said text displaying terminal unit;
means for verifying whether or not there exists a keyword in the received text message;
means for adding preset displaying attributes associated with said preset keyword to said text message, if such keyword exists in said table of present keywords; and
means for transmitting a message, corresponding to said text message added to by said preset displaying attributes, to a destination of said text message.

4. The server according to claim 3 further comprising means for accepting registration in said table of a keyword and displaying attributes associated with said keyword, from user to user, over said communication network.

5. A server connected to a text displaying terminal unit over a communication network, said server comprising means for memorizing a table of preset keywords and corresponding preset displaying attributes; wherein said preset displaying attributes include background information, background movements, and input text movements;
means for receiving a text message over said communication network from said text displaying terminal unit;
means for verifying whether or not there exists a keyword in the received text message;
means for adding preset displaying attributes associated with said preset keyword to said text message, if such keyword exists in said table of present keywords; and
means for accumulating a message, corresponding to said text message added to by said preset displaying attributes, in the form of Web information, so that a user at a destination of said message is able to browse said message.

6. The server according to claim 5 further comprising means for a particular user accepting registration in said table of the keyword and the displaying attributes associated with the keyword over said communication network.

* * * * *